(12) United States Patent
Tobi

(10) Patent No.: US 10,725,234 B2
(45) Date of Patent: Jul. 28, 2020

(54) DISPLAY DEVICE

(71) Applicant: Sharp Kabushiki Kaisha, Sakai, Osaka (JP)

(72) Inventor: Takafumi Tobi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/579,892

(22) Filed: Sep. 24, 2019

(65) Prior Publication Data
US 2020/0110216 A1    Apr. 9, 2020

Related U.S. Application Data

(60) Provisional application No. 62/741,095, filed on Oct. 4, 2018.

(51) Int. Cl.
*F21V 8/00*    (2006.01)
*G02F 1/1333*   (2006.01)
*G02F 1/1345*   (2006.01)

(52) U.S. Cl.
CPC ........ *G02B 6/0088* (2013.01); *G02F 1/13454* (2013.01); *G02F 1/133305* (2013.01)

(58) Field of Classification Search
CPC .. G02B 6/0088; G02B 6/0086; G02B 6/0081; G02B 6/0011; G02B 6/0065; G02F 1/133305; G02F 1/13454; F21V 2200/20
See application file for complete search history.

(56) References Cited

U.S. PATENT DOCUMENTS

| | | | |
|---|---|---|---|
| 2007/0274670 A1* | 11/2007 | Tsai | G02F 1/133308 385/147 |
| 2008/0218661 A1* | 9/2008 | Tsai | G02B 6/0083 349/65 |
| 2019/0094448 A1* | 3/2019 | Watanabe | G02B 6/0036 |
| 2019/0113796 A1* | 4/2019 | Jin | G02F 1/133308 |

FOREIGN PATENT DOCUMENTS

JP    2008-203444 A    9/2008

* cited by examiner

*Primary Examiner* — Bao Q Truong
(74) *Attorney, Agent, or Firm* — Keating & Bennett, LLP

(57) ABSTRACT

A display device includes a light source, a light guide plate through which light from the light source travels, an optical sheet providing an optical effect to light that exits the light guide plate, a display panel displaying an image upon receiving the light from the optical sheet, a frame in which the light guide plate and the optical sheet are arranged, and a fixing tape with which a peripheral edge of the optical sheet and a peripheral edge of the display panel or a peripheral edge of the frame and the peripheral edge of the display panel are bonded to each other. The fixing tape has a notched portion through which an inner peripheral edge and an outer peripheral edge of the fixing tape are communicated with each other.

6 Claims, 8 Drawing Sheets

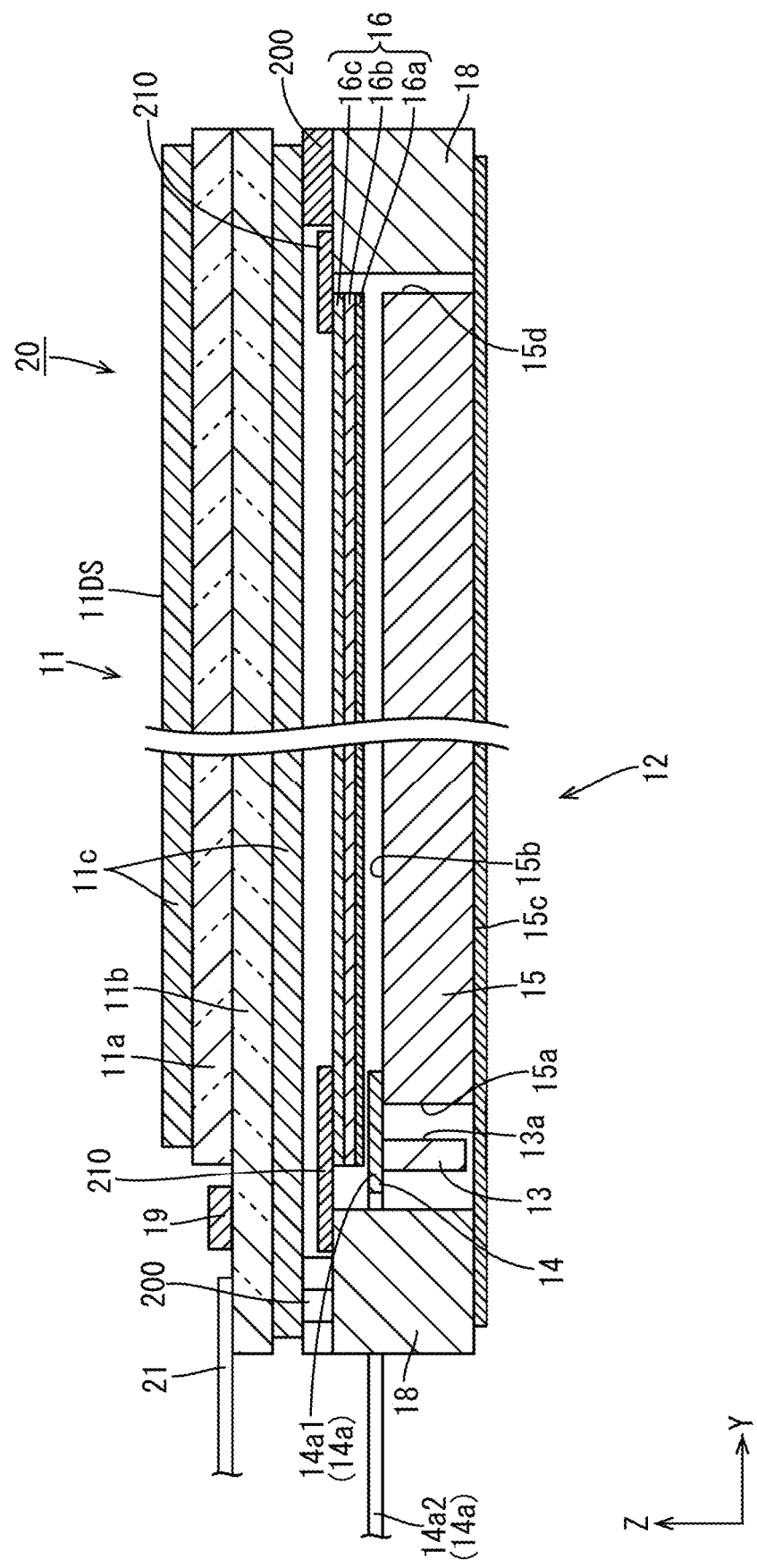

DISPLAY DEVICE

CROSS REFERENCE TO RELATED APPLICATION

This application claims priority from U.S. Provisional Patent Application No. 62/741,095 filed on Oct. 4, 2018. The entire contents of the priority application are incorporated herein by reference.

TECHNICAL FIELD

The technology described herein relates to a display device.

BACKGROUND ART

As a conventional liquid crystal display device, for example, the device disclosed in Japanese Unexamined Patent Application Publication No. 2008-203444 is known. The liquid crystal display device includes a backlight, a liquid crystal panel illuminated by the backlight, a frame accommodating the backlight and the liquid crystal panel, a light-shielding adhesive tape with which the backlight is bonded to the frame and that prevents light from the backlight from leaking to surroundings, and a double-sided adhesive tape with which the liquid crystal panel is bonded to the frame. Using the double-sided adhesive tape, other than the light-shielding adhesive tape, which is used to bond the liquid crystal panel to the frame, makes it easy to replace the liquid crystal panel without damaging the backlight and the like.

In the liquid crystal display device, the light-shielding adhesive tape also functions to fix various types of optical films (optical sheets) arranged on the liquid crystal panel side of the backlight. The light-shielding adhesive tape and the double-sided adhesive tape with which the liquid crystal panel is bonded to the frame surround the gap between the optical sheet and the liquid crystal panel to form an enclosed space. Accordingly, when these members are bonded, the optical sheet may be deflected by an air-lock in the enclosed space, resulting in sticking to the liquid crystal panel. When the optical sheet contracts or expands due to some reason after being bonded, a similar trouble sometimes occurs. As a result, luminance unevenness occurs or a concentric stripe pattern called Newton's rings appears in the liquid crystal display device.

With a reduction in the thickness of a liquid crystal display device, the gap between an optical sheet and a liquid crystal panel further decreases. In addition, the optical sheet itself tends to decrease in thickness. Accordingly, such a problem may become more conspicuous.

SUMMARY

The technology described herein has been made in consideration of the above situation, and an object is to suppress deflection of the optical sheet.

A display device according to the technology described herein includes a light source, a light guide plate through which light from the light source travels, an optical sheet providing an optical effect to light exiting the light guide plate, a display panel (liquid crystal panel) displaying an image upon receiving the light from the optical sheet, a frame in which the light guide plate and the optical sheet are arranged, and a fixing tape with which a peripheral edge of the optical sheet and a peripheral edge of the display panel or a peripheral edge of the frame and the peripheral edge of the display panel are bonded to each other. The fixing tape has a notched portion through which an inner peripheral edge and an outer peripheral edge of the fixing tape are communicated with each other.

According to the technology described herein, deflection of the optical sheet is less likely to be caused.

BRIEF DESCRIPTION OF THE DRAWINGS

FIG. 8 is a sectional view of the liquid crystal display device according to the second embodiment taken along line ii-ii in FIG. 7.

DETAILED DESCRIPTION

First Embodiment

The first embodiment will be described with reference to FIGS. 1 to 3. The present embodiment will exemplify a liquid crystal display device 10. Note that the X-, Y-, and Z-axes are shown in part of each drawing, and the respective axial directions are common throughout the respective drawings. Assume that the upper and lower sides in FIG. 2 are respectively defined as the front and back sides.

Figure 1:
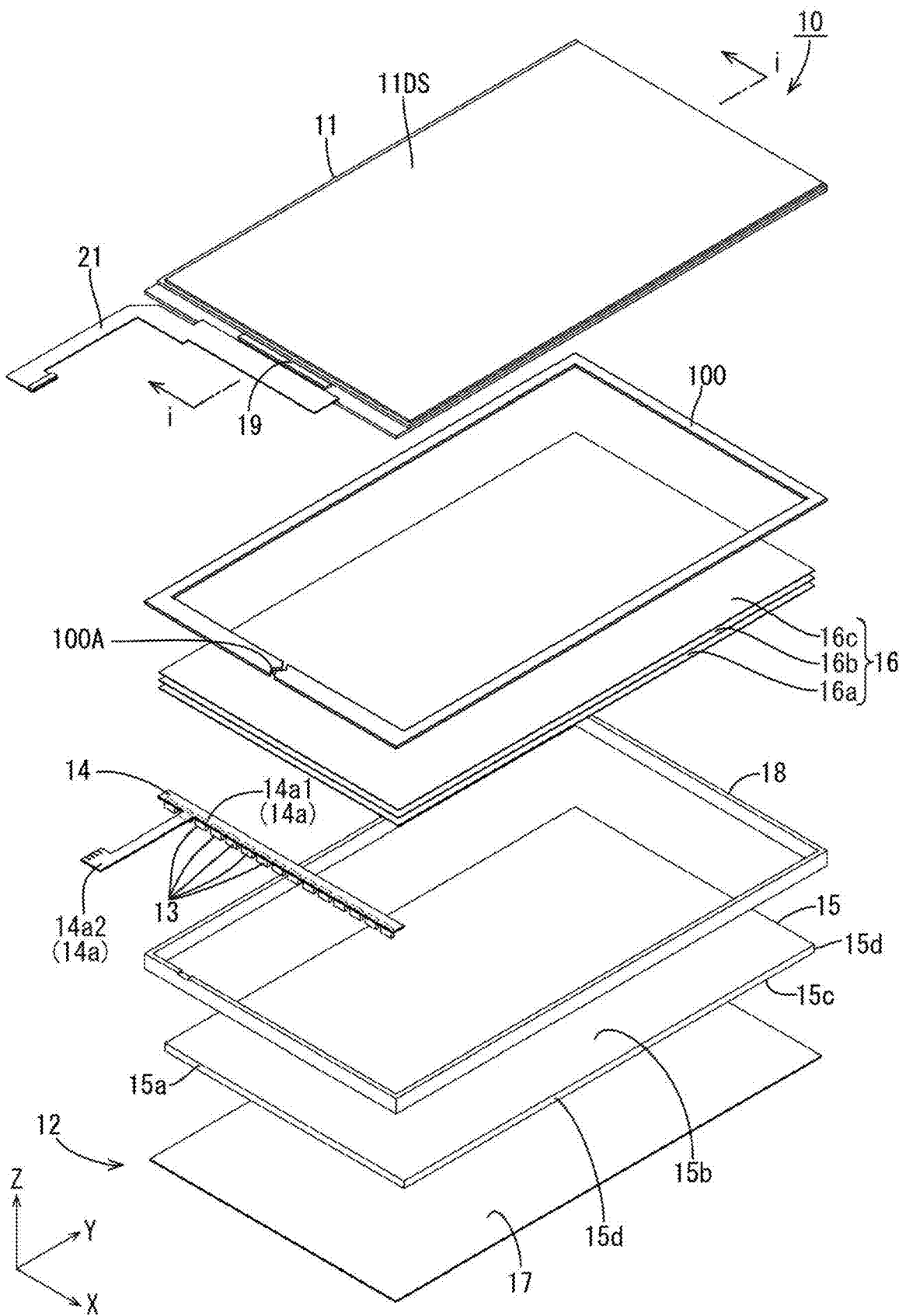
FIG. 1 is an exploded perspective view of a liquid crystal display device according to the first embodiment.

The liquid crystal display device 10 has a vertically long rectangular shape, as shown in the perspective view of FIG. 1. The liquid crystal display device 10 includes a liquid crystal panel 11 having a display surface 11DS that can display an image, a backlight device (lighting device) 12 that is disposed on a back side of the liquid crystal panel 11 to supply the liquid crystal panel 11 with light for display, and a fixing tape 100 with which the liquid crystal panel 11 is bonded to the backlight device 12. The liquid crystal display device 10 according to the present embodiment is used for a portable information terminal such as a smartphone. Accordingly, the screen of the liquid crystal panel 11 of the liquid crystal display device 10 has a size (for example, about several inches) generally classified as small.

The liquid crystal panel 11 will be described first. FIG. 2 is a sectional view of the liquid crystal display device 10 taken along line i-i in FIG. 1. Line i-i is a straight line located in almost the middle of a short side (a side portion extending in the X-axis direction) of the liquid crystal display device 10 and extending along the long side direction (Y-axis direction). As shown in the sectional view of FIG. 2, the liquid crystal panel 11 is configured such that a pair of almost transparent glass substrates 11a and 11b is bonded to each other with a predetermined gap between them, and a liquid crystal is sealed between the substrates 11a and 11b. The array substrate (active matrix substrate) 11b, of the pair of substrates 11a and 11b, which is disposed on the back side is provided with switching elements (for example, TFTs) connected to source lines and gate lines perpendicular to each other, pixel electrodes connected to the switching elements, an aligning film, and the like. The liquid crystal panel 11 also includes a display portion (active area) on which an image is displayed and a non-display portion (non-active area) formed into a picture frame-like shape (frame-like shape) surrounding the display portion and on which no image is displayed. Note that a pair of front and back polarizing plates 11c is bonded to the outer surface sides of the pair of substrates 11a and 11b.

Figure 2:
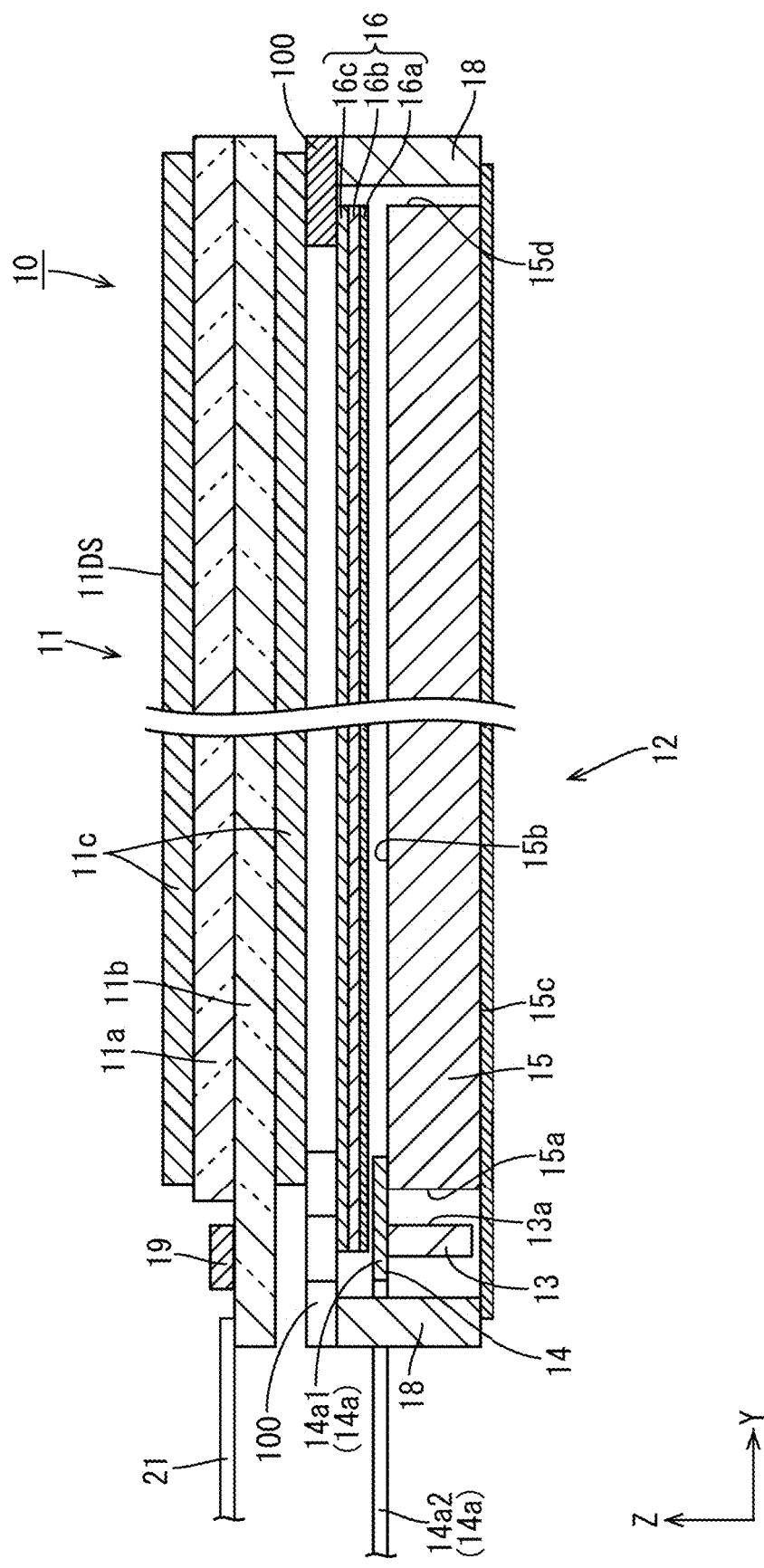
FIG. 2 is a sectional view of the liquid crystal display device according to the first embodiment taken along line i-i in FIG. 1.

As shown in FIGS. 1 and 2, a driver (panel driving part) 19 that drives the liquid crystal panel 11 and a flexible substrate (connecting part) 20 that electrically connects the liquid crystal panel 11 to an external panel control board are mounted on the array substrate 11b of the liquid crystal panel 11. Of these parts, the driver 19 is mounted on the array substrate 11b by COG (Chip On Glass). The driver 19 is formed from an LSI chip internally having a driving circuit. The driver 19 operates, on the basis of a signal supplied from the panel control board as a signal supply source, to generate an output signal by processing an input signal supplied from the panel control board and output the output signal to the display area of the array substrate 11b. The flexible substrate 20 includes a base material formed from an insulating, flexible synthetic resin material (for example, a polyimide-based resin), and has multiple wiring patterns on the base material. The flexible substrate 20 is bent in a folded-back state in the liquid crystal display device 10, with one end side in the longitudinal direction being connected to the panel control board and the other end side being connected to the array substrate 11b of the liquid crystal panel 11.

The backlight device 12 will be described next. As shown in FIG. 1, the backlight device 12 includes light emitting diodes (LEDs) 13 as light sources, an LED substrate (light source substrate) 14 on which the LEDs 13 are mounted, a light guide plate 15 that guides light from the LEDs 13, an optical sheet (optical member) 16 stacked on the front side of the light guide plate 15, a reflecting sheet (reflecting member) 17 stacked on the back side of the light guide plate 15, and a frame-like frame 18 accommodating the LEDs 13, the light guide plate 15, an optical sheet 16, and the like. The backlight device 12 is of an edge light type (side light type) of a one side light incident type that has the LED substrate 14 disposed on one of a pair of end portions on the short-side side and is configured to cause light from the LEDs 13 to enter the light guide plate 15 only from one side. Each component part of the backlight device 12 will be described in detail next.

As shown in FIGS. 1 and 2, each LED 13 is configured such that an LED chip is sealed with a sealing material on a substrate portion fixed to the LED substrate 14. The LED 13 has anode and cathode terminals and makes the LED chip emit light by causing a DC current as a forward bias to flow between the terminals. The LED 13 emits white light as a whole by, for example, forming the LED chip into a chip for monochromatically emit blue light and dispersing and compounding phosphors (for example, yellow, green, and red phosphors) in a sealing material. The LED 13 is of a so-called side-emitting type configured such that a surface of the LED 13, which is adjacent to a surface mounted on the LED substrate 14, becomes a light-emitting surface 13a.

As shown in FIGS. 1 and 2, the LED substrate 14 is disposed on the front side relative to the frame 18 and the light guide plate 15 so as to be sandwiched between them and the liquid crystal panel 11. The LED substrate 14 has a substrate portion (base material) 14a in the form of a flexible film (sheet) made of an insulating material. The substrate portion 14a of the LED substrate 14 is constituted by an LED mounting portion 14a1 extending along the X-axis direction and a leading portion 14a2 extended from the LED mounting portion 14a1 to the outside of the frame 18 along the Y-axis direction. The plurality (15 in FIG. 1) of LEDs 13 are mounted on the LED mounting portion 14a1 so as to be arranged along the extending direction (X-axis direction) at almost equal intervals in the X-axis direction, and the respective LEDs 13 are connected in series via an LED line portion. The LED line portion receives power from an LED control board via the leading portion 14a2.

The light guide plate 15 is made of an almost transparent synthetic resin material (for example, an acrylic resin such as PMMA or polycarbonate) so as to have a sufficiently higher refractive index than air. As shown in FIGS. 1 and 2, the light guide plate 15 has a vertically long plate-like shape like the liquid crystal panel 11 and is accommodated, with the periphery of the light guide plate 15 being surrounded by the frame 18, so as to be disposed immediately below the liquid crystal panel 11 and the optical sheet 16. One (on the left side in FIG. 2) of the end faces, of the outer circumferential end faces of the light guide plate 15, which are located on the short-side side serves as a light incident end face (light source facing end face) 15a that faces the LEDs 13 and receives light from the LEDs 13. In contrast to this, the remaining three end faces (the other end face on the short-side side and the pair of end faces on the long-side side) serve as non-light incident end faces (light source non-facing end faces) 15d that do not face the LEDs 13 and do not directly receive light from the LEDs 13. The light incident end face 15a linearly extends parallel to the light-emitting surfaces 13a of the LEDs 13 along the X-axis direction (the arraying direction of the LEDs 13). The plate surface, of the pair of front and back plate surfaces of the light guide plate 15, which faces the front side (liquid crystal panel 11 side) serves as an output light plate surface 15b through which light exits toward the liquid crystal panel 11, and the plate surface facing the back side serves as an output light opposite plate surface 15c on the opposite side to the output light plate surface 15b. The output light plate surface 15b is parallel to a plate surface (display surface 11DS) of the liquid crystal panel 11 and faces the plate surface of the liquid crystal panel 11 through the optical sheet 16 (to be described next). According to such a configuration of the light guide plate 15, light emitted by the LEDs 13 along the Y-axis direction enters through the light incident end face 15a and travels within the light guide plate 15 and thereafter, the light is directed in the Z-axis direction and exits through the output light plate surface 15b toward the optical sheet 16 side (the front side or light exit side).

As shown in FIGS. 1 and 2, the optical sheet 16 has a vertically long plate-like shape like the liquid crystal panel 11 and the light guide plate 15 and is disposed between the liquid crystal panel 11 and the light guide plate 15 in the Z-axis direction, with a plate surface of the optical sheet 16 being parallel to the plate surfaces of the liquid crystal panel 11 and the light guide plate 15, thereby having a function of outputting exit light from the light guide plate 15 toward the liquid crystal panel 11 while adding a predetermined optical effect to the exit light. More specifically, the optical sheet 16 according to the present embodiment is formed by sequentially stacking three sheets, namely, a diffuser sheet 16a, a first prism sheet 16b, and a second prism sheet 16c, from the back side. The diffuser sheet 16a is formed by dispersing and providing multiple diffusion particles in a base material made of an almost transparent synthetic resin, and has a function of diffusing transmitted light. The first prism sheet 16b and the second prism sheet 16c each are formed by collaterally providing multiple prisms, each extending in one direction, on a plate surface of a base material made of an almost transparent synthetic resin, and selectively exert a light concentrating effect in the arraying direction of the prisms. The first prism sheet 16b and the second prism sheet 16c are arranged so as to make their prisms become perpendicular to each other.

As shown in FIGS. 1 and 2, the reflecting sheet 17 is disposed so as to cover the output light opposite plate surface 15c of the light guide plate 15 while a plate surface of the reflecting sheet 17 is parallel to the plate surfaces of the liquid crystal panel 11 and the light guide plate 15. The reflecting sheet 17 has excellent light reflectivity and hence can efficiently raise light leaking from the output light opposite plate surface 15c of the light guide plate 15 toward the front side (output light plate surface 15b). The reflecting sheet 17 has an outer shape slightly larger than the light guide plate 15 and is disposed such that one end portion of the reflecting sheet 17 on the long-side side protrudes more to the LEDs 13 than the light incident end face 15a.

The frame 18 is made of a synthetic resin (for example, polycarbonate) so as to have, for example, a white or black surface, and is formed to have a frame-like outer shape slightly larger than the light guide plate 15, as shown in FIGS. 1 and 2. The frame 18 is disposed so as to accommodate the plurality of LEDs 13, the light guide plate 15, the optical sheet 16, and the like by collectively surrounding them.

The fixing tape 100 will be described next. As shown in FIGS. 1 and 3 (a top view of the fixing tape 100 in FIG. 1), the fixing tape 100 has a vertically long frame-like shape (loop shape) conforming to the picture frame-like shape (the non-display portion that is the peripheral edge of the liquid crystal panel 11) of the liquid crystal display device 10. As shown in FIG. 2, the polarizing plate 11c that is on the back side of the liquid crystal panel 11 is bonded and fixed to the front side surface of the optical sheet 16 of the backlight device 12 with the fixing tape 100, and also the polarizing plate 11c is bonded and fixed to the front side surface of the frame 18. The fixing tape 100 is preferably a light-shielding double-sided adhesive tape formed by coating the both surfaces of a base material having a light-shielding effect with an adhesive agent.

Figure 3:
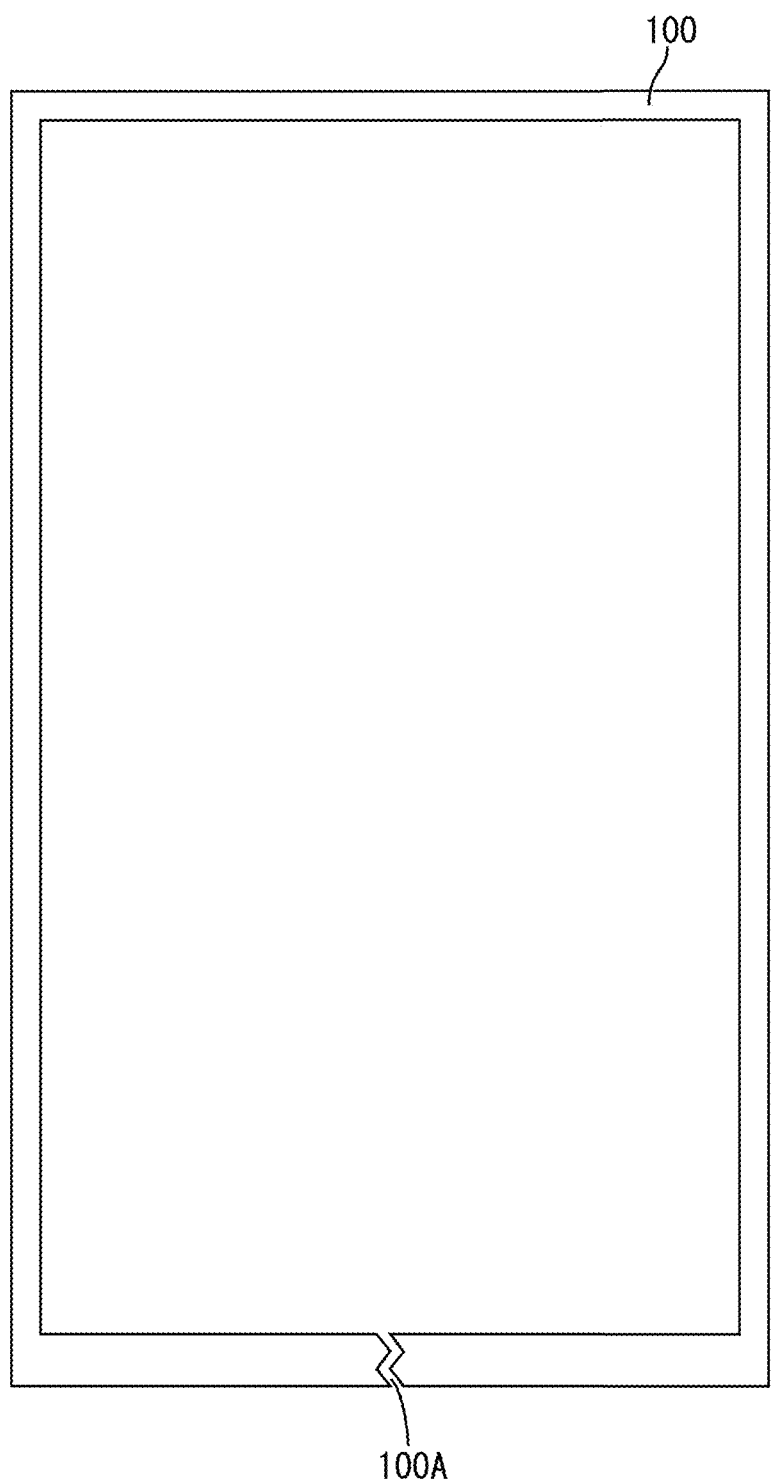
FIG. 3 is a top view of a fixing tape according to the first embodiment.
Figure 4:
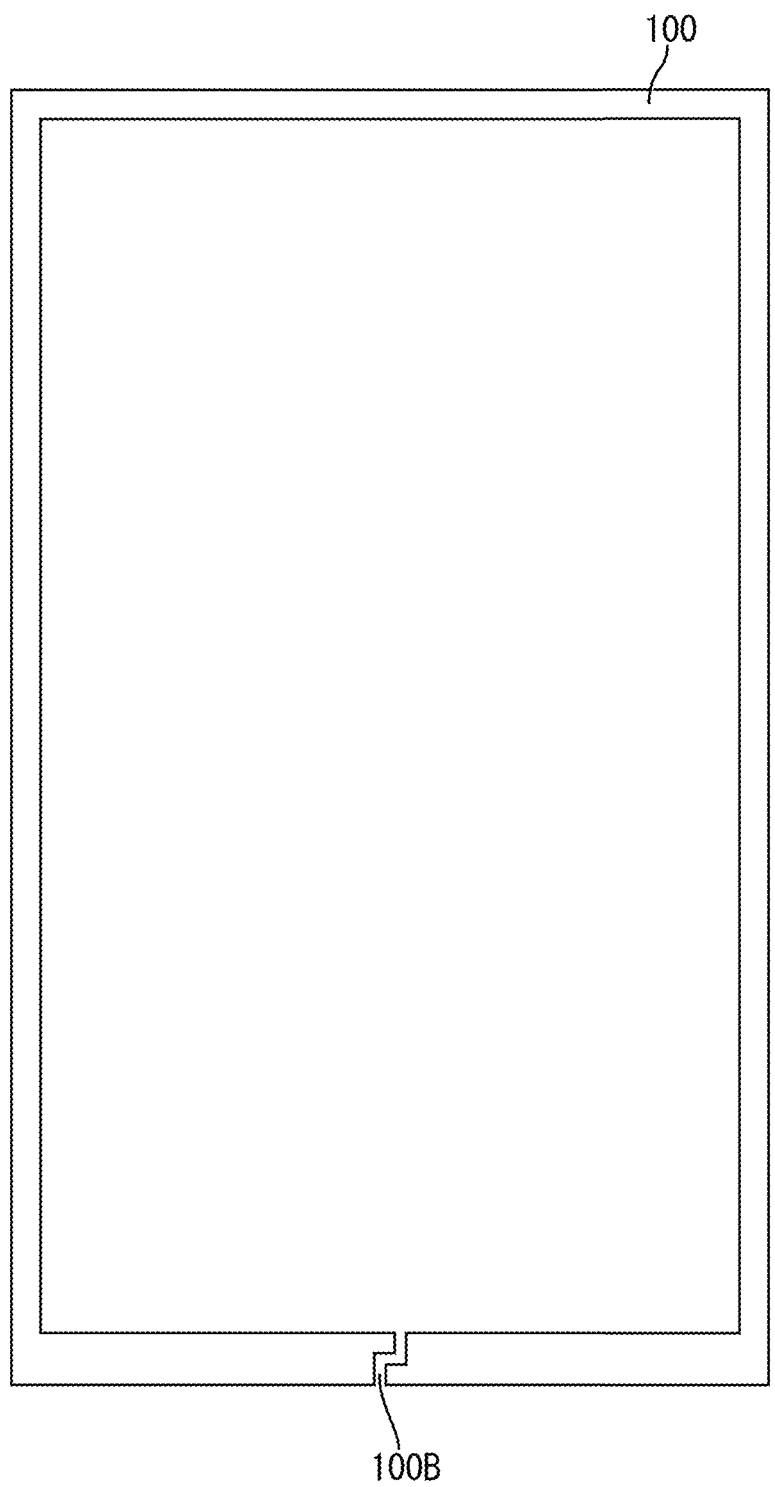
FIG. 4 is a top view showing a fixing tape according to a modification.
Figure 5:
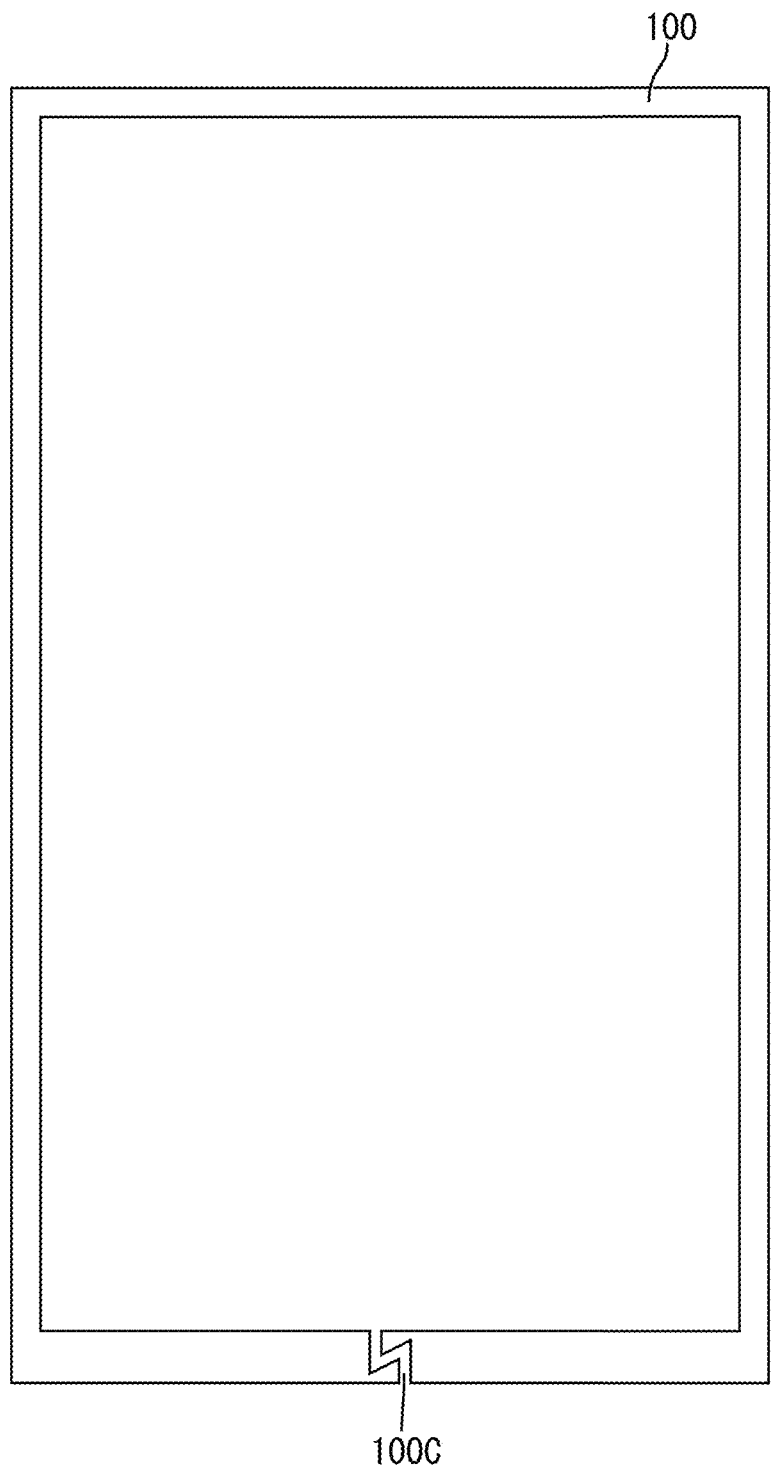
FIG. 5 is a top view showing a fixing tape according to another modification.

As shown in FIGS. 1 and 3, the fixing tape 100 has, in the middle of one (more specifically, the side portion alongside the LEDs 13) of the short sides (side portions extending in the X-axis direction), a notched portion 100A that makes the inner peripheral edge of the fixing tape 100 communicate with the outer peripheral edge (that is, makes the inner side of the frame-like shape communicate with the outer side). The notched portion 100A preferably has a shape including a plurality of linear portions with different inclinations, such as the zigzag shape shown in FIG. 3. Modifications of such a shape include a notched portion 100B having a crank shape shown in FIG. 4 and a notched portion 100C having a Z shape shown in FIG. 5 (assume that in the following description, the term "notched portion 100A" includes the notched portions 100B and 100C as the modifications unless otherwise specified).

Figure 6:
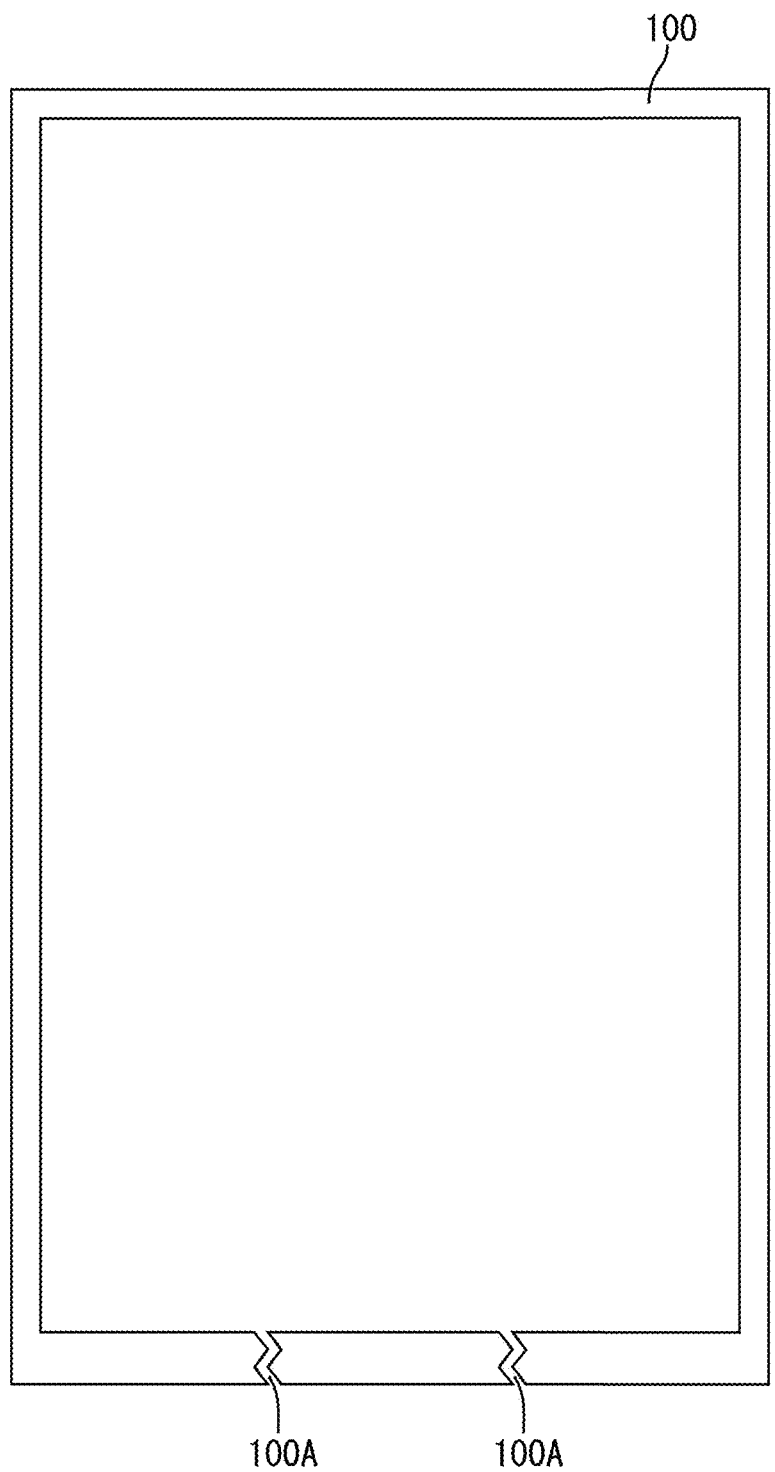
FIG. 6 is a top view showing a fixing tape according to another modification.

The linear portions constituting the notched portion 100A may have a width sufficiently smaller than the length of the side portion of the fixing tape 100 in which the linear portions are arranged and be large enough to vent air. If the width of the linear portions is too large, foreign substances may externally enter the liquid crystal display device 10 through the notched portion 100A or light leakage from the notched portion 100A may increase. As shown in FIG. 6, a plurality of notched portions 100A may be provided. Note that a method of forming the notched portions 100A is not specifically limited. The notched portions 100A may be formed in the fixing tape 100 in advance or may be formed by removing corresponding portions from the fixing tape 100 after being fixed.

As described above, the liquid crystal display device (display device) 10 according to the present embodiment includes the LEDs (light sources) 13, the light guide plate 15 that guides light from the LEDs 13, the optical sheet 16 that gives an optical effect to exit light from the light guide plate 15, the liquid crystal panel (display panel) 11 that displays an image upon receiving exit light from the optical sheet 16, the frame 18 accommodating the light guide plate 15 and the optical sheet 16, and the fixing tape 100 with which the peripheral edge of the optical sheet 16 is bonded to the peripheral edge of the liquid crystal panel 11. The fixing tape 100 has the notched portion 100A that makes the inner peripheral edge of the fixing tape 100 communicate with the outer peripheral edge.

With this arrangement, at the portion provided with the notched portion 100A, the polarizing plate 11c is not bonded to the optical sheet 16 with the fixing tape 100. This portion becomes an air passage communicating with the outside of the liquid crystal display device 10. Accordingly, air in the gap between the liquid crystal panel 11 and the optical sheet 16 is vented from the notched portion 100A of the fixing tape 100 to the outside of the liquid crystal display device 10. Preventing the occurrence of an air-lock prevents the optical sheet 16 from being deflected or bonded to the liquid crystal panel 11. This makes it possible to prevent luminance unevenness and Newton's rings from occurring in the liquid crystal display device 10.

Proving a plurality of notched portions 100A as shown in FIG. 6 can form a plurality of air passages described above and hence can easily vent air in the gap between the liquid crystal panel 11 and the optical sheet 16 to the outside of the liquid crystal display device 10.

In the optical sheet 16 according to the present embodiment, the sheet (second prism sheet 16c) that gives a light concentrating effect is provided on the layer nearest to the liquid crystal panel 11. This sheet faces the gap between the liquid crystal panel 11 and the optical sheet 16, and hence is generally most easily deflected. If the sheet that gives a light concentrating effect is deflected, the distance between the sheet and the liquid crystal panel 11 becomes partially uneven, and Newton's rings tend to appear, thus making the problems prominent. This enables the notched portions 100A to exert a deflection suppressing effect more effectively.

Using a light-shielding double-sided adhesive tape as the fixing tape 100 can prevent light from the backlight device 12 (LEDs 13) from leaking to the surroundings. Although double-sided bonding allows efficient bonding work, providing the notched portions 100A may cause light leakage from them. Accordingly, the influence of light leakage can be suppressed by forming the shape of each notched portion 100A into a shape (for example, the zigzag shape in FIG. 3) including a plurality of linear portions with different inclinations.

Note, however, that when the notched portion 100A has the above complicated shape, the notched portion 100A can be easily formed in a portion, of the fixing tape 100, which has a large width. The fixing tape 100 is generally wider on the LED 13 side. Accordingly, when the fixing tape 100 is configured to have the notched portion 100A disposed in a side portion on a side where the LEDs 13 are disposed, the notched portion 100A having the complicated shape can be easily provided.

Second Embodiment

The second embodiment will be described with reference to FIGS. 7 and 8. The second embodiment will exemplify a change in the arrangement of a fixing tape 200. Note that redundant descriptions of the same arrangement and effect as those of the first embodiment described above will be omitted.

Figure 7:
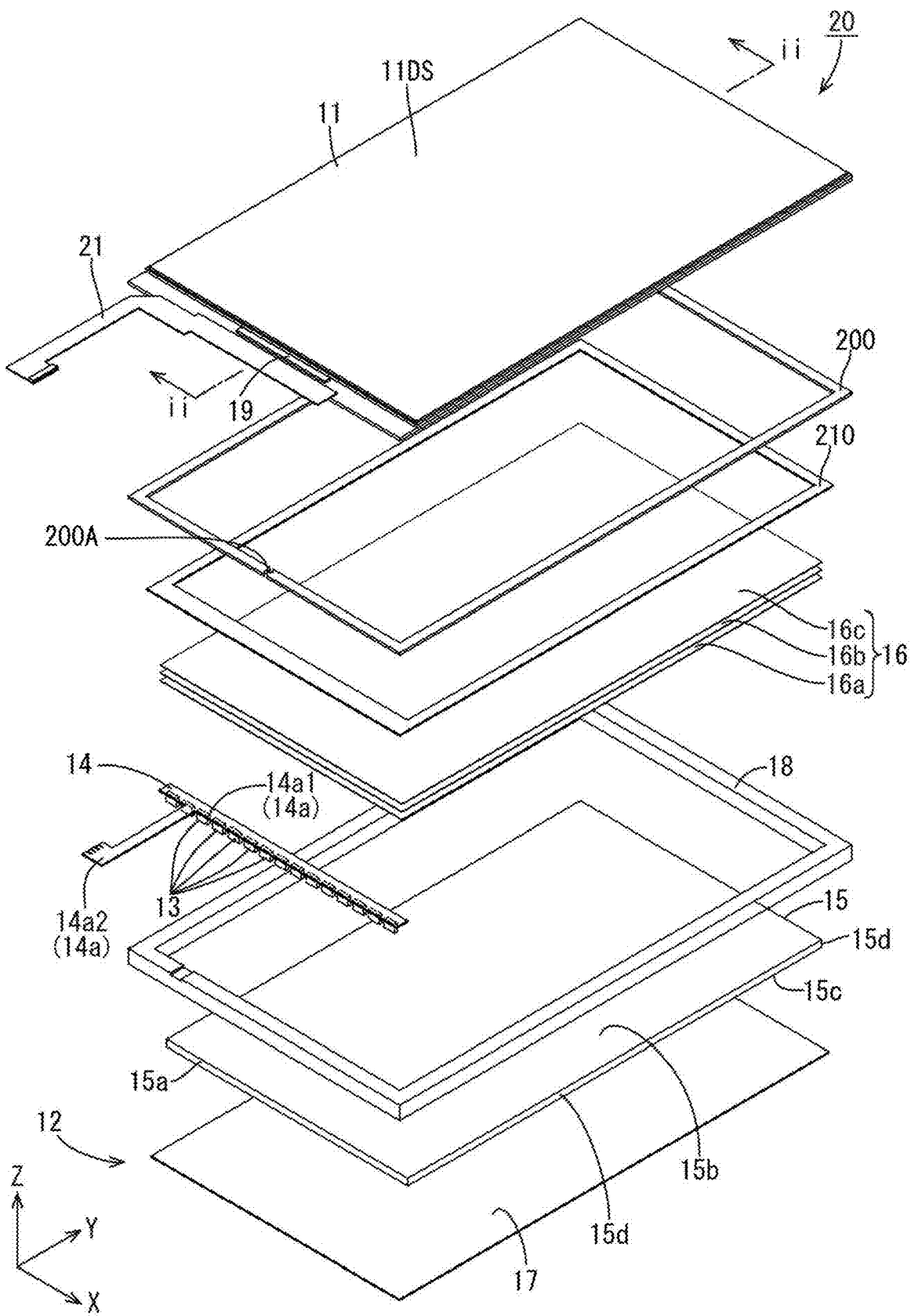
FIG. 7 is an exploded perspective view of a liquid crystal display device according to the second embodiment.

FIG. 7 is an exploded perspective view of a liquid crystal display device 20. FIG. 8 is a sectional view of the liquid crystal display device 20 taken along line ii-ii in FIG. 7. Line ii-ii is a straight line located in almost the middle of a short side (a side portion extending in the X-axis direction) of the liquid crystal display device 20 and extending along the long side direction (Y-axis direction). As shown in FIGS. 7 and 8, with the fixing tape 200 according to the present embodiment, a polarizing plate 11c that is on the back side and extends in the Y-axis direction is bonded to the front side surface of a frame 18. However, unlike in the first embodiment, the polarizing plate 11c and an optical sheet 16 are not bonded with the fixing tape 200. The optical sheet 16 is bonded and fixed to the front side surface of the frame 18 with an adhesive tape 210 different from the fixing tape 200. The fixing tape 200 has a notched portion 200A that makes its inner peripheral edge communicate with its outer peripheral edge. Air in the gap between a liquid crystal panel 11 and the optical sheet 16 is vented from the notched portion 200A to the outside of the liquid crystal display device 20.

Other Embodiments

The present technology is not limited to the embodiments described above with reference to the accompanying drawings, and, for example, the following embodiments are included in the technical scope.

(1) The embodiments each have exemplified the case in which when a plurality of notched portions are provided, all the plurality of notched portions are provided in the same side portion of the frame-like fixing tape. However, the respective notched portions may be scattered in different side portions. In addition, the plurality of notched portions need not have the same shape and may have different shapes (for example, a zigzag shape and a crank shape).

(2) The embodiments described above have exemplified the notched portions having a zigzag shape, a crank shape, and a Z shape. However, each notched portion may include a curve as long as it includes a plurality of linear portions with different inclinations.

(3) The first embodiment described above has exemplified the fixing tape with which the polarizing plate is bonded to the optical sheet. However, depending on the arrangement of a liquid crystal panel, a fixing tape may be provided to bond another constituent member (for example, a substrate) of the liquid crystal panel to the optical sheet.

(4) The second embodiment described above has exemplified the fixing tape with which the polarizing plate is bonded to the frame. However, depending on the arrangement of a liquid crystal panel, a fixing tape may be provided to bond another constituent member (for example, a substrate) of the liquid crystal panel to the frame.

(5) Each embodiment described above has exemplified the arrangement in which not all the outer circumferential end faces of the light guide plate, the optical sheet, and the reflecting sheet are flush with each other. However, each embodiment may have an arrangement in which all the outer circumferential end faces are flush with each other.

(6) Each embodiment described above has exemplified the case in which the outer shape of the liquid crystal display device, the outer shape of each constituent member of the backlight device, which conforms to the outer shape of the liquid crystal display device, and the shape of the fixing tape are vertically long rectangular shapes (frame-like shapes). However, these shapes may be non-rectangular shapes. Examples of non-rectangular shapes include semicircular shapes, fan-like shapes, and trapezoidal shapes.

(7) The above embodiments each have exemplified the liquid crystal panel having the liquid crystal layer sandwiched between the pair of substrates. However, the present technology can also be applied to a display panel having functional organic molecules (medium layer), other than a liquid crystal material, sandwiched between a pair of substrates.

(8) The above embodiments each have exemplified the liquid crystal display device including the liquid crystal panel classified as small. However, the present technology can also be applied to a liquid crystal display device including a liquid crystal panel having a screen size of, for example, 10 inches to 100 inches, which is classified as medium-small, medium, or large (extra-large). In this case, the liquid crystal display device can be used for an electronic device such as a TV receiver, electronic signboard (digital signage), or electronic blackboard. In addition, a liquid crystal display device including a liquid crystal panel classified as small may be applied to portable electronic devices such as tablet notebook personal computers other than smartphones.

(9) The above embodiments each have exemplified the liquid crystal panel as a display panel. However, the present technology can also be applied to other types of display panels (such as micro-electronic mechanical systems (MEMS) display panel).

The invention claimed is:

1. A display device comprising:
    a light source;
    a light guide plate through which light from the light source travels;
    an optical sheet providing an optical effect to light that exits the light guide plate;
    a display panel displaying an image upon receiving the light from the optical sheet;
    a frame in which the light guide plate and the optical sheet are arranged; and
    a fixing tape with which a peripheral edge of the optical sheet and a peripheral edge of the display panel or a peripheral edge of the frame and the peripheral edge of the display panel are bonded to each other, wherein
    the fixing tape has a notched portion through which an inner peripheral edge and an outer peripheral edge of the fixing tape are communicated with each other.

2. The display device according to claim 1, wherein the notched portion includes notched portions.

3. The display device according to claim 1, wherein the optical sheet includes layers stacked on each other, and a sheet that exerts a light concentrating effect is included in a layer nearest to the display panel.

4. The display device according to claim 1, wherein the fixing tape is a light-shielding double-sided adhesive tape.

5. The display device according to claim 4, wherein the notched portion has a shape including a plurality of linear portions with different inclinations.

6. The display device according to claim 5, wherein
the fixing tape is formed into a loop shape along the peripheral edge of the display panel, and
the notched portion is included in a side portion of the fixing tape having the loop shape where the light source is disposed.

* * * * *